US012264589B2

(12) United States Patent
Al Dossary et al.

(10) Patent No.: US 12,264,589 B2
(45) Date of Patent: Apr. 1, 2025

(54) TEST BENCH FOR TEST-RUNNING TURBOCHARGER

(71) Applicant: SAUDI ARABIAN OIL COMPANY, Dhahran (SA)

(72) Inventors: Ahmed Mohammed Al Dossary, Dammam (SA); Majed S. Alaboush, Ras Tanura (SA); Marzuoq T. Otaibi, Al Khobar (SA); Nassir Saleh Al Faihani, Dammam (SA); Saleh Ali Al-Najrani, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 108 days.

(21) Appl. No.: 17/823,912

(22) Filed: Aug. 31, 2022

(65) Prior Publication Data

US 2024/0068378 A1 Feb. 29, 2024

(51) Int. Cl.
*F01D 21/00* (2006.01)
*F01D 25/04* (2006.01)
*F01D 25/20* (2006.01)

(52) U.S. Cl.
CPC ........... *F01D 21/003* (2013.01); *F01D 25/04* (2013.01); *F01D 25/20* (2013.01);
(Continued)

(58) Field of Classification Search
CPC ........ F01D 21/003; F01D 25/04; F01D 25/20; F05D 2220/40; F05D 2260/83;
(Continued)

(56) References Cited

U.S. PATENT DOCUMENTS 3,740,170 A * 6/1973 Miller .................... F01D 25/186 417/407
4,446,377 A * 5/1984 Kure-Jensen ............. F02C 7/32 60/39.08

(Continued)

FOREIGN PATENT DOCUMENTS

KR 100925914 B1 11/2009

OTHER PUBLICATIONS

"Turbo Test;" Aug. 29, 2022; pp. 1-5; Retrieved from the Internet: URL: https://www.cimat-balancing.com/products-services/turbocharger-balancers-and-flow-benches/turbo-test/ (5 pages).

(Continued)

*Primary Examiner* — Jesse S Bogue
(74) *Attorney, Agent, or Firm* — Osha Bergman Watanabe & Burton LLP

(57) ABSTRACT

A system for bench-testing a turbocharger before installing the turbocharger on an engine has the turbocharger with a turbocharger turbine inlet, a turbocharger lubricating oil inlet, and a turbocharger lubricating oil outlet. The turbocharger is mounted on a support. An air supply device provides a gas flow to run the turbocharger. The air supply device is mounted on a support and has an air supply device outlet. A diffusor directs the gas flow from the air supply device outlet to the turbocharger turbine inlet. A lubricating oil pump is connected to the turbocharger lubricating oil inlet; and pumps lubricating oil from a lubricating oil tank to the turbocharger. The turbocharger is disposed above the tank and the lubricating oil flows directly into the tank via a tank hole that is open to a surrounding atmosphere.

9 Claims, 5 Drawing Sheets

(52) U.S. Cl.
CPC ...... *F05D 2220/40* (2013.01); *F05D 2260/83* (2013.01); *F05D 2260/96* (2013.01); *F05D 2260/98* (2013.01); *F05D 2270/301* (2013.01); *F05D 2270/303* (2013.01)

(58) Field of Classification Search
CPC ............. F05D 2260/96; F05D 2260/98; F05D 2270/301; F05D 2270/303; G01M 15/09

See application file for complete search history.

(56) References Cited

U.S. PATENT DOCUMENTS

| | | | | |
|---|---|---|---|---|
| 4,752,193 A * | 6/1988 | Horler | F01D 25/183 | 417/407 |
| 7,111,461 B2 * | 9/2006 | Richey | F01D 17/165 | 415/48 |
| 7,428,839 B2 * | 9/2008 | Figura | G01M 15/14 | 73/114.51 |
| 2013/0008234 A1 * | 1/2013 | Vince | G01M 15/09 | 73/49.7 |

OTHER PUBLICATIONS

"Marine diesel engine turbocharger test system;" Aug. 29, 2022; pp. 1-2; Retrieved from the Internet: URL: http://www.oleuk.com/en/page/marine-diesel-engine-turbocharger-test-system (2 pages).

Bontempo, Rodolfo et al., "Highly flexible hot gas generation system for turbocharger testing", Energy Procedia 45, pp. 1116-1125, 2014 (10 pages).

Galindo, J. et al., "Surge limit definition in a specific test bench for the characterization of automotive turbochargers", Experimental Thermal and Fluid Science 30, pp. 449-462, 2006 (14 pages).

"Test Facilities Remscheid, Germany" Aug. 29, 2022; pp. 1-3; Retrieved from the Internet: URL: https://www.avl.com/-/test-facilities-remscheid-germany (3 pages).

"Engineering Turbocharging" Aug. 29, 2022; pp. 1-9; Retrieved from the Internet: URL: https://www.fev.com/what-we-do/engineering-services/turbocharging/ (9 pages).

Lujan, J.M. et al., "Test Bench for Turbocharger Groups Characterization", SAE Technical Paper Series 2002-01-0163, SAE International, 2002 (10 pages).

"Marine diesel engine turbocharger test bench" Aug. 30, 2022; pp. 1-4; Retrieved from the Internet: URL: https://nobalt.com/en/solutions/ship-building-and-repairing/marine-diesel-engine-turbocharger-test-bench (4 pages).

"Test bench soultions for modern drive concepts" Aug. 31, 2022; pp. 1-7; Retrieved from the Internet: URL: https://www.kratzer-automation.com/en/testsystems/system-solutions/ (7 pages).

* cited by examiner

TEST BENCH FOR TEST-RUNNING TURBOCHARGER

BACKGROUND

Modern engines are equipped with turbochargers which require overhauling following the prescribed maintenance interval of the turbocharger manufacturer. Upon completing the overhaul and performing various static checks, the turbochargers are subjected to a short-term assessment by performing a test of the refurbishment of the turbocharger. This test may reveal failures that occur very soon after refurbishment. Such failures are known in the art as infant mortality failures. The test of the turbocharger is typically performed by reinstalling the turbocharger on the engine and then operating the engine under various loads and for various durations to determine whether or not the overhaul procedure of the turbocharger was successful. If a turbocharger overhaul was not effective as determined by an infant mortality failure of the test of the turbocharger after reinstallation on the engine, then the turbocharger must be removed and in doing so, the operator must incur the installation and removal costs a second time. Turbocharger failure modes may include failures under conditions such as heat and flowrate that may be simulated without the use of an engine.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

This disclosure presents, in accordance with one or more embodiments, methods and systems for a Test Bench for Test-Running Turbochargers.

This disclosure presents, in accordance with one or more embodiments, a turbocharger testing system for bench-testing a turbocharger before installing the turbocharger on an engine. The turbocharger testing system has the turbocharger with a turbocharger turbine inlet, a turbocharger lubricating oil inlet, and a turbocharger lubricating oil outlet. The turbocharger is mounted on a turbocharger support. An air supply device provides a gas flow to run the turbocharger. The air supply device is mounted on a support and has an air supply device outlet. A diffusor directs the gas flow to the turbocharger. The diffusor is at the air supply device outlet and directs the air into the turbocharger turbine inlet. A lubricating oil pump is connected to the turbocharger lubricating oil inlet; and pumps lubricating oil from a tank to the turbocharger. The turbocharger is disposed above the lubricating oil tank and the lubricating oil flows directly into the lubricating oil tank via a tank hole that is open to a surrounding atmosphere.

This disclosure presents, in accordance with one or more embodiments, a method for bench-testing a turbocharger using a turbocharger testing system before installing the turbocharger on an engine. The method is to place the turbocharger above a lubricating oil tank, and then test the turbocharger by actuating the turbocharger testing system. Testing the turbocharger also includes engaging a lubrication pump power input to a lubricating oil pump configured to circulate lubricating oil from the lubricating oil tank to a turbocharger lubricating oil inlet, through a turbocharger bearing housing, out a turbocharger lubricating oil outlet, and back to the lubricating oil tank. The method also includes allowing the lubricating oil exiting the turbocharger lubricating oil outlet to drain at atmospheric pressure directly into a tank hole disposed on a tank top of the lubricating oil tank. The method also includes engaging an air supply device power input to an air supply device. The method includes monitoring, using a computer processor, a set of operational parameters of the turbocharger, collecting, using the computer processor, a set of data of the set of operational parameters, disengaging, on or after receiving a signal, the air supply device power input; and disengaging the lubrication pump power input.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
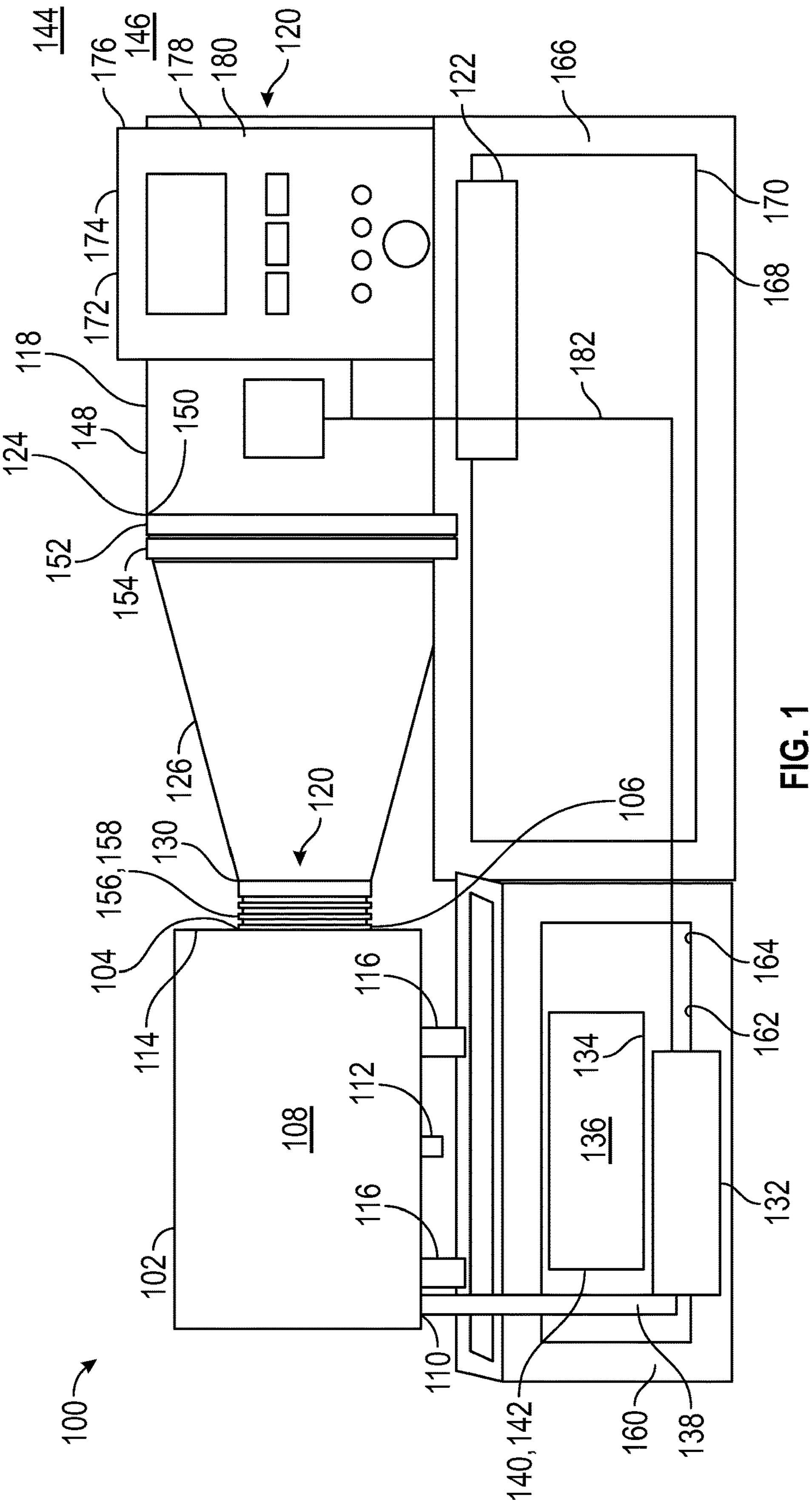
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Turbocharger failure modes may include failures under conditions such as heat and flowrate that may be simulated without the use of an engine. Turbocharger test apparatuses are available for performing such simulations. Tests that use heat to simulate hot engine exhaust gases in addition to exhaust gas flowrate may be referred to as hot tests. Hot tests may reveal infant mortality failures related to the flowrate and the heat of the exhaust gases and/or may also reveal operational characteristics that are not within the specifications of the turbocharger manufacturer. Test apparatuses that perform a hot test are typically complex and therefore likely relatively expensive, thus pose a challenge to justify for ownership under occasional use duty. Other turbocharger failure modes may include failures under conditions caused only by the exhaust gas flowrate. Tests that use flowrate without heat may also be simulated without the use of an engine. Such tests using flowrate with room-temperature gases such as atmospheric air without heating the air may be referred to as cold tests. Cold tests may reveal infant mortality failures unrelated to the heat of the exhaust gases and/or may also reveal operational characteristics that are not within the specifications of the turbocharger manufacturer. Test apparatuses that perform a cold test are typically less complex and therefore likely relatively less expensive than those that perform hot tests.

Embodiments disclosed herein facilitate performing cold tests on the turbocharger by running the turbocharger before installation using unheated air. Such tests may reveal non-heat related infant mortality failures or operational characteristics that are not within the turbocharger manufacturer's specification that, if uncorrected, may lead to such failures. As such, embodiments disclosed herein relate to a system and method for testing a turbocharger after overhaul with a turbocharger testing system, hereafter "test bench". Using an overhauled turbocharger, embodiments disclosed herein determine the integrity of the turbocharger overhaul to prevent installation of an incorrectly overhauled turbocharger onto an engine. The cold test confirms that all moving parts and seals are intact, functioning as designed and within the manufacturer's specified operational characteristics, and unlikely to fail under the tested conditions after reinstallation of the turbocharger and during commissioning of the engine.

The test bench is designed with flexibility to accommodate various types and sizes of turbochargers. In accordance with one or more embodiments the test bench may be used to test turbochargers ranging from 100 kW to 3,000 kW. However, this range is not meant to be limiting and embodiments disclosed herein may demonstrate a size range capability from a relatively small turbocharger to a relatively large turbocharger. A Caterpillar model 6N-8460 is an example of the relatively small turbocharger and its dimensions are length of 345 mm (13.6-inches (in)), width of 294 mm (11.6-in), height of 431 mm (17-in), and its weight is 34 kg (75 lbs. (pounds)). A Napier model NA 297 is an example of the relatively large turbocharger and its dimensions are length of 1,520 mm (59.8-in), width of 900 mm (35.4-in), height of 900 mm (35.4-in) and its weight is 777 kg (1,713 lbs). The NA 297 max RPM (revolutions per minute) is 29,500.

FIG. 1 shows the test bench (100) in accordance with one or more embodiments. In one or more embodiments, one or more of the modules and/or elements shown in FIG. 1 may be omitted, repeated, combined, and/or substituted. Accordingly, embodiments disclosed herein should not be considered limited to the specific arrangements of modules and/or elements shown in FIG. 1.

In one or more embodiments, FIG. 1 shows the test bench (100) having a turbocharger (102) comprising a turbocharger turbine inlet (104), a nozzle ring (106) turbocharger bearings (not pictured) housed in a turbocharger bearing housing (108), a turbocharger lubricating oil inlet (110), and a turbocharger lubricating oil outlet (112). The turbocharger (102) may comprise a turbocharger inlet flange (114). The turbocharger (102) is mounted on a turbocharger support (116) using a suitable means such as screws, clamps, straps, etc. FIG. 1 also shows an air supply device (118) configured to provide a gas flow (120) to run the turbocharger (102). The air supply device (118) is mounted on an air supply device support (122) and comprises an air supply device outlet (124).

FIG. 1 also shows a diffusor (126) configured to direct the gas flow (120) from the air supply device (118) to the turbocharger (102), more specifically, to the nozzle ring (106) of the turbocharger (102). The diffusor (126) is located at the air supply device outlet (124) and comprises a diffusor inlet and a diffusor outlet (130). The diffusor (126) is hollow along its axis and has the shape of a tapered cone for directing the gas flow (120). In one or more embodiments the diffusor may have dimensions, for example, of 630 mm (24.8-in) size at the diffusor inlet, 223 mm (8.78-in) size at the diffusor outlet (130), and 800 mm (2.62-ft) length. The diffusor may be made using suitable materials such as hot-rolled steel, cold-rolled steel, aluminum, fiberglass, etc. The diffusor may be fabricated using joining methods such as fastening, welding, bonding, etc. FIG. 1 shows that the diffusor inlet may have, in one or more embodiments, a diffusor inlet flange (154) with dimensions of, for example, 750 mm (29.5-in) outside diameter, 620 mm (24.4-in) inside diameter, 5 mm (0.2-in) thick, providing for twelve fastener holes of 11 mm (0.43-in) diameter each on a 690 mm (27.2-in) pcd (pitch circle diameter, i.e., bolt circle diameter). The air supply device outlet (124) and the diffusor outlet (130) are oriented in a direction that allow them to reach the turbocharger (102).

Figure 3:
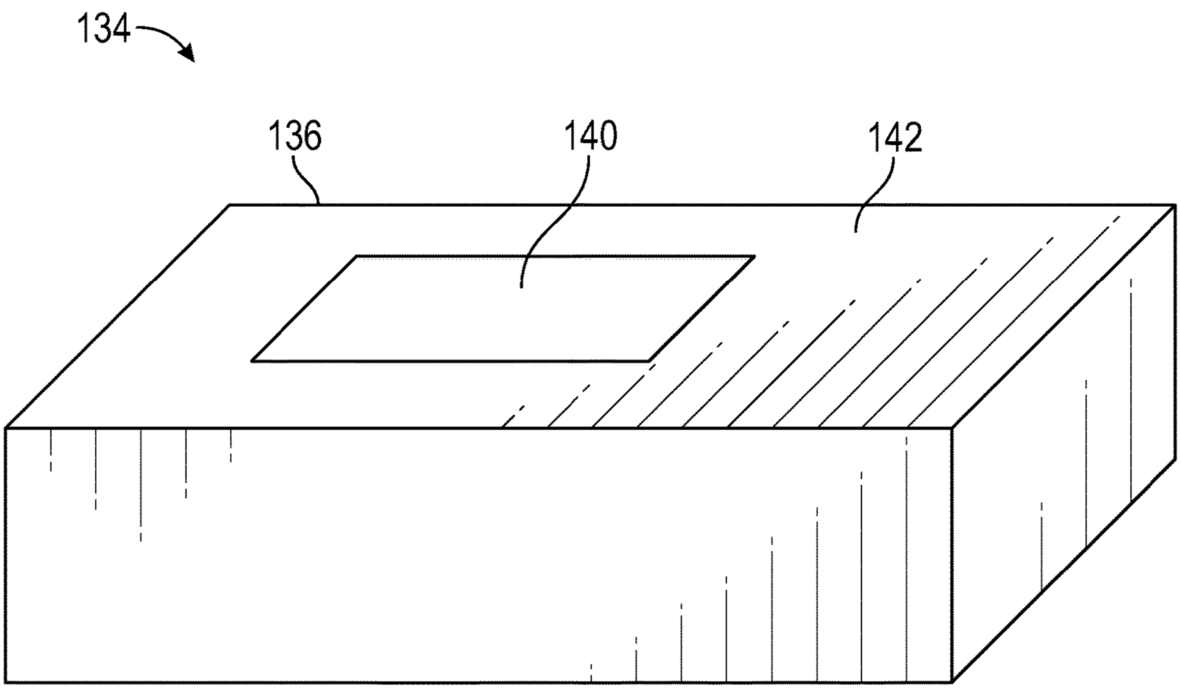
FIG. 3 shows a lubricating oil tank in accordance with one or more embodiments.

FIG. 1 also shows a lubricating oil pump (132) hydraulically connected to the turbocharger lubricating oil inlet (110). A lubricating oil tank (134), described below in FIG. 3, is also hydraulically connected to the lubricating oil pump (132) and is shown beneath the turbocharger lubricating oil outlet (112). The lubrication oil, required for the turbocharger bearings lubrication and heat withdraw (cooling), is collected by the lubricating oil tank (134). The lubricating oil pump (132) is configured to circulate lubricating oil (136) along a circulation path (138) from the lubricating oil tank (134), to the turbocharger lubricating oil inlet (110), through the turbocharger bearing housing (108), out the turbocharger lubricating oil outlet (112), and then directly back into a tank hole (140) in a tank top (142) configured to receive the lubricating oil (136) from the turbocharger lubricating oil outlet (112). The tank hole (140) and the turbocharger lubricating oil outlet (112) are open to a surrounding atmosphere (144). The lubricating oil pump (132) may be, for example, a Viking Pump model 1W-4776 providing 20 GPM (gallons per minute) at 1200 RPM and 30 GPM at 1800 RPM. The pump may be driven by an integral electric motor, but may also be driven by a pneumatic motor.

The lubricating oil lubricates the turbocharger bearings before, during, and after the turbocharger (102) operates. Lubricating the turbocharger bearings before operating the turbocharger (102) is termed priming the bearings. To operate the turbocharger (102) the operator may prime the turbocharger bearings for a lubrication oil pump prime duration.

FIG. 1 also shows that the air supply device (118) uses atmospheric air (146) as the gas flow (120) to run the turbocharger (102). No additional heat is applied to the gas flow (120); thus, in one or more embodiments, the turbocharger is tested at room temperature. The air supply device (118) may be, in one or more embodiments, an electrical axial flow fan (148). The air supply device (118) is configured to direct the flow of atmospheric air (146) to the run turbocharger, and more specifically, to direct air flow to at least the turbocharger turbine inlet (104). Any suitable air supply device (e.g., commercially available, or custom-fabricated) providing similar functionality to that described may also be implemented without departing from the scope of the present disclosure. In one or more embodiments the axial flow fan (148) may be, for example, a FlaktGroup Holding type 63JM/31/2-4/9/14-3 LM3AA160M with a maximum flowrate up to 7.28 $m^3/s$ (cubic meters per second), a fan diameter of 630 mm (24.8-in), a fan blade pitch of 4° (degrees), and powered by 23 A (amps), 440V (volts), 3-ph (phase), 60 Hz (Hertz) electric power. The axial flow fan (148) may include a mesh guard (not shown) to prevent injury to fingers, hands, arms, etc. The mesh guard may be made using suitable materials such as expanded mesh sheet steel, perforated sheet steel, egg crate sheet steel, hot-rolled steel, cold-rolled steel, aluminum, fiberglass, etc. The diffusor may be fabricated using joining methods such as fastening, welding, bonding, etc.

The axial flow fan (148) has an axial flow fan outlet (150), and the axial flow fan outlet (150) may have an axial flow fan outlet flange (152) configured to cooperate with the diffusor inlet flange (154). FIG. 1 also shows a vibration compensator (156) disposed at the diffusor outlet (130) and arranged to reduce the conveyance of vibrations caused by the air supply device (118) as conveyed through the diffusor (126) to the turbocharger turbine inlet (104). In accordance with one or more embodiments, the vibration compensator (156) may provide a seal (158) between the diffusor outlet (130) and the turbocharger turbine inlet (104).

The diffusor outlet (130) size may vary to cooperate with the turbocharger turbine inlet (104) or the vibration compensator (156). The vibration compensator (156) size may vary to cooperate with the diffusor outlet (130) and/or with the turbocharger turbine inlet (104). Although FIG. 1 shows the use of a diffusor (126) to direct the gas flow (120) from the air supply device (118) to the turbocharger turbine inlet (104), one of ordinary skill in the art will readily appreciate that the air supply device may connect directly to the turbocharger turbine inlet (104) or may otherwise be arranged to direct the gas flow (120) directly to the turbocharger turbine inlet (104) without departing from the scope of embodiments disclosed herein.

Continuing with FIG. 1, a turbocharger support frame (160) includes a turbo frame bottom (162) having a turbo support surface (164). The turbocharger support (116) is mounted to the turbo support surface (164) and arranged over the tank hole (140) and configured to align with the turbocharger lubricating oil outlet (112). FIG. 1 also shows an air supply device frame (166) comprising a fan frame bottom (168). The fan frame bottom also has a fan support surface (170). The air supply device support (122) is mounted to the fan support surface (170). The turbocharger support frame (160) and the air supply device frame (166) may be made using suitable materials such as angle iron, cold-rolled steel, hot-rolled steel, aluminum, etc. The materials may be connected using a suitable means such as screws, bolts, welds, etc. The turbocharger support frame (160) and the air supply device frame (166) may not be physically connected to each other to avoid transfer of vibration from one frame to the other.

The test bench (100) also includes a control panel (172) that uses a computer processor (174) in combination with a sensor system (176) to control the operation of the test bench (100). In one or more embodiments, the test bench (100) may include a testing system control system (178) and a monitoring subsystem (180). The sensor system (176) may include one or more sensors (e.g., pressure transmitter, temperature sensor, etc.) configured to measure the RPM, temperature, and oil pressure of the turbocharger. The monitoring subsystem (180) may include a display showing all turbocharger parameters, including a protection system to provide interlocks, alarms, and shutdowns as described below. The testing system control system (178) may also include a computer system that is the same as or similar to that of computer system (502) described below in FIG. 5 and the accompanying description. The control panel (172) may be connected to the air supply device frame (166) using a suitable means such as screws, bolts, welds, etc. and using suitable materials such as angle iron, cold-rolled steel, hot-rolled steel, aluminum, etc.

In one or more embodiments, an electrical cable harness (182) may be used to connect all of the electrical components of the turbocharger testing apparatus of FIG. 1. The electrical cable harness (182) is also configured to transmit current and keep control over the system. For the axial flow fan (148), the electrical cable harness (182) may use, for example, a four-core, 12 mm (0.47-in) diameter by 25 m (82-ft (feet)) long main power cable and a four-core, 8 mm (0.31-in) diameter by 15 m (49-ft) long motor connection cable. For the lubricating oil pump (132), the electrical cable harness (182) may use, for example, a four-core, 4 mm (0.16-in) diameter by 25 m (82-ft) long main power cable and a four-core, 2.5 mm (0.10-in) diameter by 15 m (49-ft) long motor connection cable.

Figure 2:
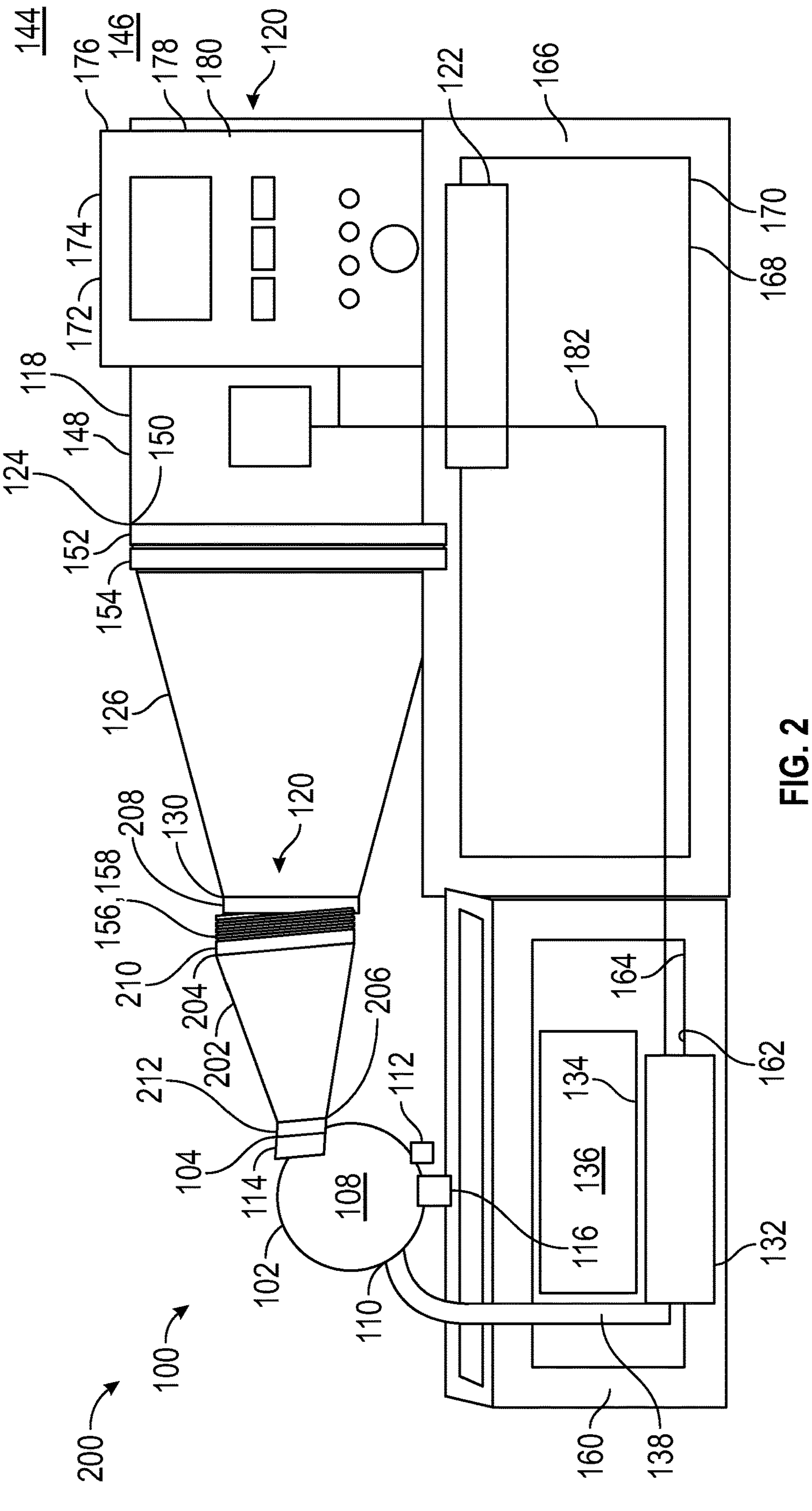
FIG. 2 shows a system in accordance with one or more embodiments.

FIG. 2 illustrates the test bench (100) in accordance with one or more embodiments disclosed herein. In one or more embodiments, one or more of the modules and/or elements shown in FIG. 2 may be omitted, repeated, combined, and/or substituted. Accordingly, embodiments disclosed herein should not be considered limited to the specific arrangements of modules and/or elements shown in FIG. 2.

FIG. 2 shows a small turbo configuration (200) of the test bench (100) illustrating that the test bench (100) may accommodate the turbocharger (102) of a relatively smaller size in comparison with the turbocharger (102) illustrated in FIG. 1. FIG. 2 shows the use of an adaptor (202) having an adaptor inlet (204) and an adaptor outlet (206) disposed at the diffusor outlet (130) and arranged to provide gas flow communication between a diffusor outlet flange (208) and the turbocharger turbine inlet (104). In one or more embodiments the adaptor may have dimensions, for example, of 223 mm (8.78-in) size at the adaptor inlet (204), 90 mm (3.5-in) size at the adaptor outlet (206), and 450 mm (17.7-in) length. The adaptor may be made using suitable materials such as hot-rolled steel, cold-rolled steel, aluminum, fiberglass, etc. The adaptor may be fabricated using joining methods such as fastening, welding, bonding, etc.

The adaptor (202) directs, into the turbocharger turbine inlet (104), the gas flow (120) that comes from the air supply device outlet (124), through the diffusor (126), and out of the diffusor outlet flange (208). In accordance with one or more embodiments, the adaptor inlet (204) may include an adaptor inlet flange (210) configured to cooperate with the vibration compensator (156). The adaptor outlet (206) may include an adaptor outlet flange (212) configured to connect to the turbocharger inlet flange (114).

In accordance with one or more embodiments the adaptor inlet (204) size may vary to cooperate with (i.e., to fit, align, and/or seal with) the diffusor outlet (130), the diffusor outlet flange (208), or the vibration compensator (156). The adaptor outlet (206) size may vary to cooperate with the turbocharger turbine inlet (104). Similarly, the vibration compensator (156) size may vary to cooperate with the adaptor outlet (206) and/or with the turbocharger turbine inlet (104). Although FIG. 2 shows the use of a diffusor (126) and an adaptor (202) to direct the gas flow (120) from the air supply device (118) to the turbocharger turbine inlet (104), one of ordinary skill in the art will readily appreciate that the air supply device may connect directly to the turbocharger turbine inlet (104) or may be arranged to direct the gas flow (120) directly to the turbocharger turbine inlet (104) without departing from the scope of embodiments disclosed herein.

Although the diffusor (126) and the adaptor (202) are described and shown as cone-shaped structures reducing in size in the direction of the gas flow (120), one of ordinary skill in the art will appreciate that the diffusor (126) and adaptor (202) may be of any shape without departing from the scope of embodiments disclosed herein.

FIG. 3 shows the lubricating oil tank (134) in more detail. The tank may be filled to 75% (percent) of its maximum capacity. For example, the lubricating oil tank (134) may have dimensions such as a length of 720 mm (28.3-in), width of 610 mm (24.0-in), and a height of 330 mm (13.0-in). These example dimensions at 75% of maximum capacity provide an oil capacity of approximately 0.11 $m^3$ (cubic meters) (29 US gallons). As can be seen in FIG. 3, the lubricating oil tank (134) includes the tank top (142) with a tank hole (140) machined into the tank top (142). The lubricating oil (136) may be contained within the lubricating oil tank (134) and the lubricating oil (136) may enter and exit the lubricating oil tank (134) using the tank hole (140). The tank hole (140) may be any orifice, recess, or opening through which the lubricating oil directly drains/falls into the lubricating oil tank (134).

Figure 4:
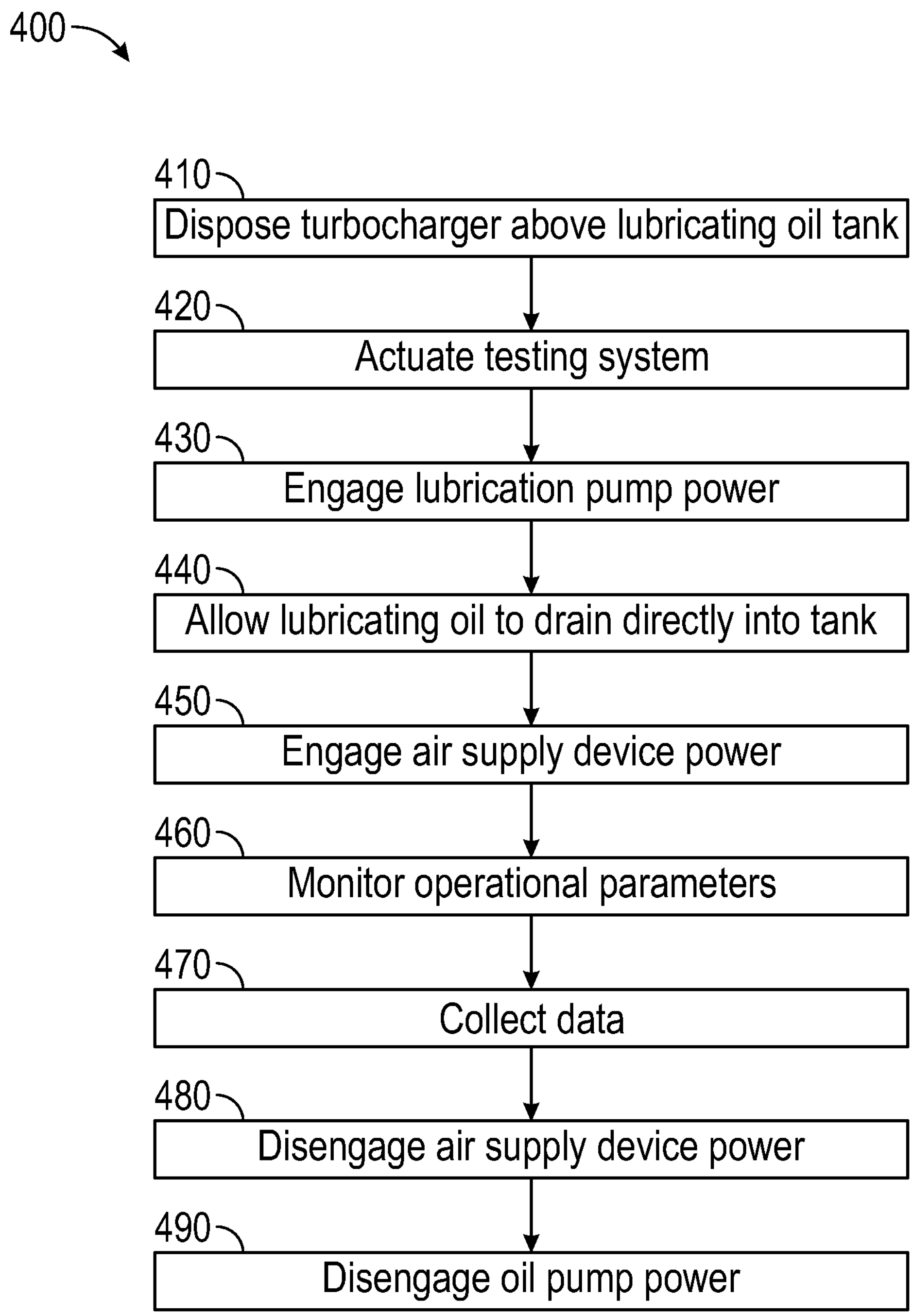
FIG. 4 shows a flowchart in accordance with one or more embodiments.

FIG. 4 depicts a flowchart in accordance with one or more embodiments. More specifically, FIG. 4 illustrates a method (Block 400) for bench-testing the turbocharger using the test bench (100) before installing the turbocharger on an engine (i.e., a cold run test). Further, one or more steps in FIG. 4 may be performed by one or more components as described in FIGS. 1-3 (e.g., the test bench (100)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

Referring to FIGS. 1-3 together, initially the turbocharger (102) is mounted (Block 410) on the turbo support surface (164) above the lubricating oil tank (134). The lubricating oil pump (132) is hydraulically connected to the turbocharger lubricating oil inlet (110). The turbocharger (102), the turbocharger lubricating oil outlet (112), and/or the tank hole (140) are arranged so that the turbocharger lubricating oil outlet (112) drains at atmospheric pressure directly into the lubricating oil tank (134) through the tank hole (140) in the tank top (142). The testing (Block 420) of the turbocharger begins by actuating the test bench (100).

The testing (Block 420) includes engaging a lubrication pump power input (Block 430) that supplies operating power to the lubricating oil pump (132). The lubricating oil pump (132) circulates the lubricating oil (136) along the circulation path (138) allowing the oil exiting the turbocharger lubricating oil outlet to drain at atmospheric pressure (Block 440) directly into the lubricating oil tank (134) through the tank hole (140) in the tank top (142). The testing (Block 420) also includes engaging an air supply device power input (Block 450) to the air supply device (118) to generate the gas flow (120).

The computer processor (174) of the control panel (172) monitors a set of operational parameters (Block 460) of the turbocharger using the sensor system (176). The computer processor (174) collects a set of data (Block 470) of the set of operational parameters. The testing (Block 420) continues with disengaging, on or after obtaining at least one signal, the air supply device power input (Block 480) and then disengaging the lubrication pump power input (Block 490). The monitoring subsystem comprises a monitoring of engagement of a lubrication oil pump power input; a monitoring of a lubrication oil pressure to the turbocharger; a monitoring of a lubrication oil pump start delay timer; and a monitoring of a lubrication oil temperature.

The method (Block 400) may further include using the testing system control system (178) with the monitoring subsystem (180) to automate the testing of the turbocharger. The testing system control system (178) uses the control panel (172) with the computer processor (174) and the sensor system (176) to perform the automation of the testing of the turbocharger (102). The method (Block 400) may include signaling the test bench (100) to actuate such as by receipt of at least one actuation signal from the monitoring subsystem (180). The testing system control system (178) may send the signaling.

The method (Block 400) may also include using the computer processor (174) to start the lubrication oil pump start delay timer for the lubrication oil pump prime duration. The computer processor may ensure engaging the air supply device power input occurs on or after the lubrication oil pump prime duration has expired. Likewise, following the disengaging of the air supply device power input, the computer processor may ensure disengaging the lubrication oil pump power input occurs on or after the lubrication oil pump cooling duration has expired. The computer processor may integrate readiness states from the monitoring subsystem (180). Readiness states may include a turbocharger ready alarm, an oil pump not running alarm, an oil pressure low alarm, or an oil prime duration not expired alarm, an oil temperature meets or exceeds high temperature limit alarm, or a system shutdown alarm, etc.

The computer processor may engage the air supply device power input on or after the lubrication oil pump prime duration expires. Before disengaging the lubrication pump power input, the computer processor may disengage the air supply device power input and then start a lubrication oil pump shut down timer for a lubrication oil pump cooling duration. The computer processor may disengage the lubrication pump power input on or after the lubrication oil pump cooling duration has expired.

The sensors of the sensor system (176) may be configured to provide operational data corresponding to operational parameters of the test bench (100). For example, the sensors may be configured to provide actual pressure data (e.g., oil pressure) for the turbocharger (102) operating at a particular gas flowrate and/or for a particular duration. The sensor system may include sensors such as those for detecting that the lubricating oil pump is running and for measuring lubricating oil flowrate and temperature, and other operational parameters.

The sensor system (176) may be operatively coupled to the control panel (172) for conveying data corresponding to characteristics of components of the test bench (100) as well as operational data of the turbocharger (102) to the control panel (172). For example, the data may include alternating current frequency, power consumption, temperature, and pressure. To that end, such sensors may include frequency sensors, amperage sensors, voltage sensors, temperature sensors, pressure sensors, rotational velocity sensors, etc. The sensor data may be recorded on computer-readable storage media by the control panel (172) and/or transmitted by the control panel (172) to one or more monitoring entities.

The monitoring subsystem (180) may monitor the engagement of the lubrication oil pump power input to prevent starting the air supply device if the lubricating oil pump is not running. The monitoring subsystem (180) may monitor the lubrication oil pressure to the turbocharger to obtain a pressure value and may compare the obtained pressure value, using the computer processor, with a pressure range. The monitoring subsystem (180) may control the air supply device (118) using the compared lubrication oil pressure to the turbocharger. The monitoring subsystem (180) may monitor the lubrication oil pump start delay timer to prevent starting the air supply device if the lubrication oil pump prime duration has not expired.

The monitoring subsystem (180) may monitor the lubrication oil temperature to obtain a temperature value and may compare the obtained temperature value, using the computer processor, with an oil temperature range. The monitoring subsystem (180) may report an oil temperature alarm using the compared lubrication oil temperature. The monitoring subsystem (180) may control the air supply device (118) using the compared lubrication oil temperature.

According to further embodiments, the test bench (100) may include an interlock to prevent starting the axial flow fan (148) if the lubricating oil pump (132) is not running. The test bench (100) may also include an interlock to prevent starting the axial flow fan (148) if the lubricating oil (136) pressure to the turbocharger (102) does not meet a pressure range, such as a range of 2.2-3.3 bar. Further, the test bench (100) may include an interlock to prevent starting the axial flow fan (148) if the turbocharger (102) has not been primed for a lubrication oil pump prime duration such as a minimum of five (5) minutes. The test bench (100) may also include a test bench alarm that will sound if the oil temperature does not fall within an oil temperature range such as from room temperature to 125° C. A system shutdown may also be included to shut down the system if the lubricating oil (136) pressure falls outside the pressure range.

The method (Block 400) may further involve storing an operational record, e.g., maintained in the computer-readable storage media, in a database, or other suitable data storage structure operatively connected to the control panel and part of the computer system. An illustrative operational record may comprise any data suitable for tracking the operational characteristics of the turbocharger during the test. For example, the operational record may include the turbocharger manufacturer, the turbocharger model, the lubrication oil pump prime duration minimum as specified by the turbocharger manufacturer, the lubrication oil pump output pressure, etc. In addition to storing the operational record, the operational record may be reported, for example, to the monitoring entity. According to some embodiments, the test may indicate that the desired outcome was not achieved and that further examination of the system may be desirable. In such a case the report may include an alert and an advisory to the monitoring entity and/or one or more concerned entities (e.g., a technician), as desired.

Figure 5:
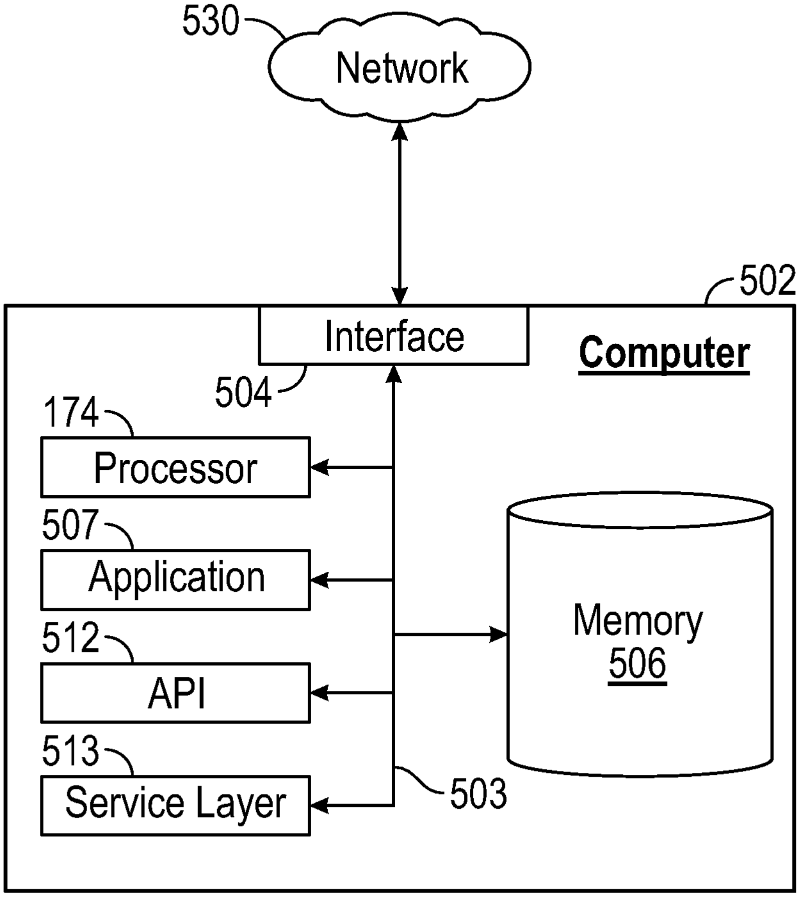
FIG. 5 shows a computing system in accordance with one or more embodiments.

Embodiments disclosed herein may be implemented on a computer system. FIG. 5 is a block diagram of a computer system (or computing device) (502) used to provide computational functionalities associated with described algorithms, methods, functions, processes, flows, and procedures as described in the instant disclosure, according to an implementation. The illustrated computer (502) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include an input device, such as a keypad, keyboard, touchscreen, or other device that can accept user information, and an output device that conveys information associated with the operation of the computer (502), including digital data, visual, or audio information (or a combination of information), or a GUI. The output device may include a screen (e.g., a liquid crystal display (LCD), a plasma display, a light emitting diode (LED) display, an organic light-emitting diode (OLED) display, touchscreen, cathode ray tube (CRT) monitor, projector, or other display device), a printer, external storage, or any other output device. One or more of the output devices may be the same or different from the input device(s). Many different types of computing systems exist, and the aforementioned input and output device(s) may take other forms.

The computer (502) can serve in a role as a client, network component, a server, a database, or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud, fog, or edge-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether illustrated, or) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504) includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (174). Although illustrated as a single computer processor (174) in FIG. 5, two or more processors may be used according to particular needs, desires, or particular implementations of the computer (502). Generally, the computer processor (174) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502). Memory (506) can include non-persistent and persistent storage. The input and output device(s) may be locally or remotely connected to the computer processor(s) (174) and the memory (506).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), wherein each computer (502) communicates over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

The described process may be conducted for each turbocharger. According to some embodiments, variations in the process may be made without departing from the scope of the present disclosure. Testing the turbochargers prior to reinstallation may increase the reliability of the turbocharger once it is installed. The testing allows simulating the actual turbocharger running condition in situations in which testing capabilities are limited due to safety concerns related to the use of engine exhaust gas and/or a gas specification that replicates engine exhaust gas. The testing provides quality assurance that the seals do not leak, that the bearings are intact, and that the rotor runs smoothly. The testing improves safety and provides more simplicity to reproduce turbocharger running conditions within the workshop.

Although only a few illustrative embodiments have been described in detail above, those skilled in the art will readily appreciate that many modifications are possible in the example embodiments without materially departing from the scope of the present disclosure. For example, embodiments disclosed herein are not linked to any particular brand of equipment used for the test bench. Accordingly, all such modifications are intended to be included within the scope of this disclosure as defined in the following claims.

What is claimed:

1. A method for bench-testing a turbocharger using a turbocharger testing system before installing the turbocharger on an engine, the method comprising:

disposing the turbocharger above a lubricating oil tank; and testing the turbocharger by actuating the turbocharger testing system, wherein testing the turbocharger further comprises:

engaging a lubrication pump power input to a lubricating oil pump configured to circulate lubricating oil from the lubricating oil tank to a turbocharger lubricating oil inlet, through a turbocharger bearing housing, out a turbocharger lubricating oil outlet, and back to the lubricating oil tank;

allowing the lubricating oil exiting the turbocharger lubricating oil outlet to drain at atmospheric pressure directly into a tank hole disposed on a tank top of the lubricating oil tank;

engaging an air supply device power input to an air supply device;

monitoring, using a computer processor, a set of operational parameters of the turbocharger;

collecting, using the computer processor, a set of data of the set of operational parameters;

disengaging, on or after receiving a signal, the air supply device power input; and disengaging the lubrication pump power input;

wherein the turbocharger testing system further comprises a monitoring subsystem; and wherein the monitoring subsystem comprises:

a monitoring of engagement of a lubrication oil pump power input;

a monitoring of a lubrication oil pressure to the turbocharger;

a monitoring of a lubrication oil pump start delay timer; and a monitoring of a lubrication oil temperature.

2. The method of claim 1, wherein the turbocharger testing system further comprises a testing system control system comprising the computer processor used to automate the testing of the turbocharger, wherein actuating the turbocharger testing system further comprises signaling the turbocharger testing system to actuate, wherein signaling the turbocharger testing system to actuate further comprises using the testing system control to send an actuation signal from the testing system control to the turbocharger testing system, wherein engaging the lubrication pump power input further comprises:

starting, using the computer processor, a lubrication oil pump start delay timer for a lubrication oil pump prime duration; and reporting, using the computer processor, on or after the lubrication oil pump prime duration has expired, a turbocharger ready alarm, wherein engaging the air supply device power input occurs on or after the lubrication oil pump prime duration has expired, wherein disengaging the air supply device power input further comprises starting, using the computer processor, a lubrication oil pump shut down timer for a lubrication oil pump cooling duration, and wherein disengaging the lubrication pump power input occurs on or after the lubrication oil pump cooling duration has expired.

3. The method of claim 1, wherein the actuating the turbocharger testing system further comprises integrating, using the computer processor, readiness states from the monitoring subsystem.

4. The method of claim 1, wherein the actuating the testing system further comprises receiving at least one signal from the monitoring subsystem.

5. The method of claim 1, wherein monitoring of engagement of the lubrication oil pump power input prevents starting the air supply device if the lubricating oil pump is not running and wherein monitoring of the lubrication oil pressure to the turbocharger is compared, using the computer processor, with a pressure range.

6. The method of claim 5, wherein monitoring of the lubrication oil pump start delay timer prevents starting the air supply device if a lubrication oil pump prime duration has not expired and wherein monitoring of a lubrication oil temperature is compared, using the computer processor, with an oil temperature range.

7. The method of claim 6, wherein comparing with the pressure range is determined by a testing system control system to obtain a pressure value to control the air supply device.

8. The method of claim 7, wherein comparing with the oil temperature range is determined by the testing system control system to obtain a temperature value to report an oil temperature alarm.

9. The method of claim 8, wherein comparing with the oil temperature range is determined by the testing system control system to obtain the temperature value to control the air supply device.

* * * * *